United States Patent
Chan et al.

(10) Patent No.: US 6,553,034 B2
(45) Date of Patent: *Apr. 22, 2003

(54) VIRTUAL PATH RING PROTECTION METHOD AND APPARATUS

(75) Inventors: Eric L. Chan, Lisle, IL (US); Andy D. Helfrich, Bolingbrook, IL (US); Leland M. Kornhaus, Aurora, IL (US)

(73) Assignee: Tellabs Operations, Inc., Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/905,734

(22) Filed: Jul. 14, 2001

(65) Prior Publication Data

US 2001/0046206 A1 Nov. 29, 2001

Related U.S. Application Data

(63) Continuation of application No. 09/268,174, filed on Mar. 15, 1999, now Pat. No. 6,301,254.

(51) Int. Cl.$^7$ .................................................. H04J 3/14
(52) U.S. Cl. ...................... 370/397; 370/217; 370/221; 370/225; 370/258; 370/403; 359/115
(58) Field of Search ................. 370/216, 221, 370/222, 223, 224, 395.1, 396, 397, 398, 399, 403, 404, 405, 409, 452, 460, 217, 225, 249, 258, 351, 406; 359/115, 118, 119, 135

(56) References Cited

U.S. PATENT DOCUMENTS

| 4,866,421 A | * | 9/1989 | Szczepanek | 370/452 |
| 6,202,082 B1 | * | 3/2001 | Tomizawa et al. | 370/403 |
| 6,256,292 B1 | * | 7/2001 | Ellis et al. | 370/396 |

* cited by examiner

Primary Examiner—Dang Ton
Assistant Examiner—Shick Hom
(74) Attorney, Agent, or Firm—McAndrews, Held & Malloy, Ltd.

(57) ABSTRACT

A method and apparatus for the robust implementation and protection of Asynchronous Transfer Mode (ATM) traffic over a Synchronous Optical Network (SONET) Unidirectional Path Switched Ring (UPSR). The traditional SONET bridging function is eliminated for the ATM traffic in favor of a selector function. The selector function occurs at the ingress of the ATM traffic to the UPSR and directs the ATM traffic to its destination via a virtual path over the UPSR. The ATM traffic is protected from both SONET failures and ATM failures by means of an Intra-Ring Communication (IRC) protocol. The IRC protocol governs failure detection and the notification of the SONET nodes on the UPSR of the failure and any protection switch that may be necessary.

3 Claims, 10 Drawing Sheets

| NAME/NUMBER | DESCRIPTION | COMMENTS |
|---|---|---|
| $V_C$ 402 | VCI ROUTING | THIS BIT SELECTS WHETHER THIS VP IS TERMINATED AT SINGLE EGRESS POINT ON THE RING OR IS TERMINATED AT EACH DAS NODE ON THE RING. |
| $B_D$ 404 | BROADCAST DROP | THIS BIT INDICATES THAT THIS CELL IS ON A BROADCAST VP. WHEN SET, THE S NODE FIELD WILL BE USED TO DETERMINE WHICH DIRECTION WILL BE SELECTED FOR DROPPING THE CELL. THIS IS BASICALLY THE SELECTOR FUNCTION IN THE TRADITIONAL TDM USPR. |
| P 406 | PROTECTED MODE | PROTECTED MODE BIT IS NOT SET WHEN THE CELL IS NOT DESTINED FOR A RING OR FOR BROADCAST VPS ON THE RING. |
| U 410 | UNPROTECTED CLASS OF SERVICE | RESERVED FOR FUTURE ENHANCEMENT. |
| D 408 | DIRECTION | THE WORKING DIRECTION IN THE ABSENCE OF A RING FAILURE. DETERMINES WHICH PROTECTION TABLE ENTRY BIT IS CONSIDERED FIRST, THE CCW OR CW BIT. |
| ALTERNATE VPI 412 | REPLACEMENT VPI | THE PROTECTION VPI TO BE SUBSITUTED FOR THE ORIGINAL VPI IN THE EVENT THAT THE ORIGINAL ROUTE IS BLOCKED DUE TO A RING FAILURE. |
| D_NODE 414 | DESTINATION NODE | THE DESTINATION NODE WITHIN THE RING IN WHICH THE VPI/VCI COMBINATION TERMINATES. |
| D_RING 416 | DESTINATION RING | THE DESTINATION RING THAT THE CELL WILL BE SENT ON. |
| S_NODE 405 | SOURCE NODE | USED TO DETERMINE WHICH DIRECTION TO DROP THE CELL FROM. |
| CW_BIT (DESTINATION PROTECTION TABLE) 430 | CLOCKWISE BIT | THE FAILURE STATUS FOR A GIVEN DESTINATION IN THE CW DIRECTION. THE DIRECTION BIT IN THE VP TABLE DETERMINES WHICH PROTECTION ENTRY BIT IS CONSIDERED FIRST. |
| CCW_BIT (DESTINATION PROTECTION TABLE) 435 | COUNTER-CLOCKWISE BIT | THE FAILURE STATUS FOR A GIVEN DESTINATION IN THE CCW DIRECTION. THE DIRECTION BIT IN THE VP TABLE DETERMINES WHICH PROTECTION ENTRY BIT IS CONSIDERED FIRST. |

VIRTUAL PATH RING PROTECTION METHOD AND APPARATUS

CROSS-REFERENCE TO RELATED APPLICATIONS

The present application is a continuation of U.S. patent application Ser. No. 09/268,174 filed Mar. 15, 1999, now U.S. Pat. No. 6,301,254.

STATEMENT AS TO RIGHTS TO INVENTIONS MADE UNDER FEDERALLY SPONSORED RESEARCH AND DEVELOPMENT

Not Applicable.

BACKGROUND OF THE INVENTION

The present invention generally relates to a method for transmitting data over a Synchronous Optical Network (SONET) and, more particularly, to a method for providing robust Asynchronous Transfer Mode (ATM) traffic over a SONET network.

Recent years have witnessed an increase in communications network bandwidth demands. The present day T1 and T3 communications networks are being supplanted by higher throughput networks such as SONET networks. A Synchronous Optical Network (SONET) is a type of communications network capable of transmitting data in the gigabit per second range in some implementations.

The basic building block in a SONET is the synchronous transport signal level-1 (STS-1). The STS-1 is transported as a 51.840 Mb/s serial transmission rate using an optical carrier level-1 (OC-1) optical signal. Higher data rates are transported in a SONET by synchronously multiplexing N lower level modules (such as STS-1s) together to form an STS-N. Each STS-N frame is transmitted in 125 $\mu$s so that 8000 frames occur per second. The rate of data transmission over a SONET network may be described as either the rate of electrical transmission (synchronous transport signal level) or the rate of optical transmission (optical carrier level), which are equivalent. Thus, an STS-1 line rate corresponds to an OC-1 line rate.

The STS-1 frame structure has two parts, the transport overhead and the synchronous payload envelope (SPE). The transport overhead occupies the first three columns (bytes) of the 90 column by 9 row STS-1 frame and the remaining 87 bytes form the SPE. The transport overhead of the STS-1 frame is allocated as follows. The data payload to be transported is first mapped into the SPE. This operation is defined by the path layer and is accomplished using path terminating equipment. Associated with the path layer are some additional bytes named the path overhead (POH) bytes, which are also placed in the SPE. After the formation of the SPE, the SPE is placed into the frame along with some additional overhead bytes which are named the line overhead (LOH) bytes. The LOH bytes are used to provide information for line protection and maintenance purposes. The LOH is created and used by line terminating equipment such as the multiplexers between optical carriers. The next layer is defined as the section layer. It is used to transport the STS-1 frame over a physical medium. Associated with this layer are the section overhead (SOH) bytes. These bytes are used for framing, section error monitoring, and section level equipment communications. The physical layer is the final layer and transports bits serially as either optical or electrical entities. There is no overhead at this layer.

Four different size payloads, called virtual tributaries (VT) fit into the SPE of the STS-1. These are: VT1.5, which is 1.728 Mb/s; VT2, which is 2.304 Mb/s; VT3, which is 3.456 Mb/s; and VT6, which is 6.912 Mb/s. Each VT requires a 500 $\mu$s structure (four STS-1 frames) for transmission.

An STS-N is formed by byte interleaving the multiple STS-1 signals that comprise the STS-N signal. An STS-N may be thought of an N×810 bytes or as an N×90 column×9 row structure. A concatenated STS (STS-Nc) is a number of STS-1s that are maintained together. Certain services such as asynchronous transfer mode (ATM) payloads may find such STS-Nc structures appealing because the multiples of the STS-1 rate are mapped into an STS-Nc SPE. The STS-Nc is multiplexed, switched, and transported as a single unit.

A SONET network is often implemented as a SONET ring. A SONET ring is a series of communication nodes interconnected by links to form a closed loop, where links are fiber optical cables and the nodes are SONET multiplex equipment with additional ring functions. In general, SONET rings are of three types: Unidirectional Path Switched Ring (UPSR), 2-Fiber Bidirectional Line-Switched Ring (BLSR), and 4-Fiber BLSR. All three architectures provide physical circuit protection for improved transport survivability: self-healing via SONET Path Selection on the UPSR and Automatic Protection Switching (APS) on the BLSRs.

An Add/Drop Multiplexer (ADM) is a SONET multiplexer that allows signals to be added into or dropped from an STS-1. ADMs have two bidirectional ports, commonly referred to as east and west ports. ADMs may be used in SONET Self-Healing Ring (SHR) architectures. A SHR uses a collection of nodes equipped with ADMs in a physical closed loop so that each node is connected to two adjacent nodes in a duplex connection. Any loss of connection due to a single failure of a node or a connection between nodes may be automatically restored in this topology, although the data traffic sourced or sunk (delivered) at the node is lost.

A UPSR normally has working traffic and protection traffic provisioned such that they travel in opposite directions around the ring and do not traverse the same intermediate nodes. Working traffic may also be set up such that both directions of transmission are bidirectional on the ring. UPSRs are defined for 2-fiber rings: one fiber ring carries a working signal (SONET STS/VT path) in one direction, and the second fiber ring carries an identical "protection" signal in the opposing direction. Because UPSRs carry the same traffic in opposing directions on two different fiber rings, they are sometimes referred to as counter-rotating rings. A UPSR implements "self-healing" by using a Path Selector to compare the working and protection signals (SONET paths) that are terminating at the receiving node in order to select which of the two to drop.

Time-division multiplexing (TDM) is the most common technique in use today. TDM time interleaves the supported channels onto the same transmission medium. TDM requires a rigid allocation of the transmission resource in which the available bandwidth is fully used only if all of the channels are active simultaneously. Therefore, TDM is well suited to support communication services with a constant activity rate for the duration of the connection, as in the case of voice services. Other services whose information sources are active only for a small percentage of time, typically data services, tend to waste transmission bandwidth in TDM networks because the bandwidth is allocated according to peak needs.

The asynchronous transfer mode (ATM) technique is intended to avoid wasting bandwidth by sharing transmission and switching resources between several connections without any static bandwidth allocation to individual connections. Therefore, information from the signal connections may be statistically multiplexed onto the same communication resource, thus avoiding resource waste when the source activity level is low. ATM multiplexing requires, however, that each piece of information be accompanied by the routing information, which is no longer given by the position of the information within a frame, as in the case of TDM.

ATM is a cell switching and multiplexing standard that allows a single switch and transport network to handle all services such as data, multimedia, and image services with one standard. Logical channels are formed using the cell headers. ATM switches in the network act on the headers to logically route the cells through the network. ATM may support variable rate and constant rate traffic and is scalable to support services of different bandwidths.

An ATM cell includes a 5-byte cell header and a 48-byte payload. The cell header includes the following fields: the Virtual Path Identifier (VPI) the Virtual Channel Identifier (VCI), Payload Type (PT), Cell Loss Priority (CLP) and Header Error Control (HEC). Additionally, ATM requires connections to be established prior to data flow. ATM uses routing tables at each node along the path of a connection that map the connection identifiers from the incoming links to the outgoing links. Two levels of routing hierarchies, Virtual Paths (VPs) and Virtual Channels (VCs) are defined for ATM traffic.

A VP is a collection of one or more VCs traversing multiple nodes. Each VP has a bandwidth associated with it limiting the aggregate bandwidth of VCs that may be multiplexed within that VP. Virtual path identifiers (VPIs) are used to route cells between nodes that originate, remove, or terminate the VPs. Virtual channel identifiers (VCIs) are used at end nodes to distinguish between individual connections. It is noted that there is no difference between a VP and a VC when a VP is defined over a single physical link. When a VP is defined over two or more physical links, it reduces the size of the routing tables by allowing a number of VCs to be switched based on a single identifier, that is, the VPI.

Two distinctive features characterize an ATM network: (1) The user information is transferred through the network in small fixed-size units called ATM cells, each 53 bytes long and (2) it is a connection-oriented network. That is, cells are transferred using preconfigured paths identified by a label carried on the cell header.

ATM switches in an ATM network act on the information in the cell headers to logically route the cells through the network and take care of variable bandwidth to the customer on a VP/VC basis. Thousands of VCs may be carried in a VP and hundreds/thousands of VPs may be carried in a physical link. For example, a standard signal rate for carrying ATM cells is a SONET concatenated STS-3c signal. The ATM layer is processed by ATM switches that make routing decisions based on the Virtual Path Identifier (VPI) and Virtual Channel Identifier (VCI) bits in the cell headers.

Thus, an ATM network represents flexibility with regards to the type of data traffic that can be supported and the communications bandwidth that may be allocated to a specific application. On the other hand, a SONET network is a fast and high-bandwidth network. Thus, combining the speed of a SONET network with the flexibility of ATM traffic may yield a faster, but yet more flexible network. This is highly desirable.

A SONET ATM virtual path ring (VPR) (either UPSR or BLSR) is generally similar to a SONET based ring with the exception that protection is done in the VP level instead of the VT level. The term VP in the context of the SONET ATM VP ring is the available bandwidth for ATM cells to be transported transparently between a pair of ring nodes.

A SONET Unidirectional Path Switched Ring (UPSR) supporting ATM traffic requires protection at the Virtual Path (VP) level. Providing protection at the VP level instead of at the VT level provides two major benefits. First, the VPR VP level protection allows variable bandwidth size instead of the fixed VT sizes. The VP size is limited only by the physical medial transmission rate. Second, the VPR VP level protection allows for a much greater number of connections on the ring. This is because the variable bandwidth VPs can be much smaller than the smallest VTs. The use of VPs also affords additional flexibility because the VTs are defined in fixed increments which can not be changed.

The basic data transfer vehicle of a SONET network is the Synchronous Transport Signal Level-1 (STS-1). An STS-N is formed by byte interleaving the STS-1 signals that comprise the STS-N signal. Each STS-N is partitioned into a transport overhead segment and a synchronous payload envelope (SPE) segment.

VP level protection is necessary to reliably transport ATM traffic within the STS-N envelope. In a synchronous, Time Division Multiplexer (TDM) system such as a SONET UPSR network. a particular connection such as an STS-N or a VT has a single source (ingress) to the UPSR ring and a single destination (egress) from the ring. The VPR feature allows multiple ring nodes to source and receive traffic to and from an STS-N or STS-Nc. A failure on the ring causes the receiving node to receive part of its ATM traffic from the clockwise (CW) direction and part of its traffic in the counter-clockwise (CCW) direction. The STS-N ADM (Add Drop Mux) selects the appropriate STS-N from either the CW or the CCW direction.

While the standard SONET protections are sufficient to protect virtual tributaries (VTs), the standard protection is insufficient to protect VPs. In the TDM world, the VTs within the STS-N are protected based on bridging (traffic is sent on both CCW & CW fibers) the traffic at the ingress and continuously checking the Circular Redundancy Check (CRC) at the egress for both CCW & CW fibers. This is not a feasible implementation for the ATM world because of the nature of the traffic. ATM traffic's bandwidth can vary, and can be bursty in nature. For example, in order to implement a sub-60 ms protection mechanism on a per-VP basis, each VP requires 84.8 kb/s overhead (53 bytes×8 bits/byte div by 5 ms). In this example, the massive number of VPs needing to be protected would consume half the bandwidth on an OC-3. In addition, it would require a considerable amount of processing power, both hardware and software, to detect a segment failure. This is not a very cost efficient approach.

Also, once the failure is detected, there is still the need to perform a protection switch quickly. However, a fiber cut can cause thousands of VPs to fail. This would place processing constraints on the network element that exceed commercially available processing resources. A commercially realistic network must be able to both detect a communication failure and perform the UPSR protection switch within a short time, preferably within 60 ms.

Although some initial explorations have begun as to implementing ATM traffic over a SONET network, currently no standards exist for protecting the integrity of ATM traffic on SONET rings. One proposed criteria for implementing ATM traffic in a SONET ring is described in the publication by Bellcore numbered GR-2837-CORE dated Dec. 1, 1994 and titled "ATM Virtual Path Functionality in SONET Rings—Generic Criteria." (hereafter Bellcore criteria). However, the Bellcore criteria provides no method for protecting ATM traffic on a SONET ring.

A need remains for protection for ATM traffic on a SONET network ring. It is an object of the preferred embodiment of the present invention to meet this need.

SUMMARY OF THE INVENTION

One objective of the preferred embodiment of the present invention is to protect ATM traffic on a SONET UPSR ring. A further objective is to implement such protection within 60 milliseconds from a failure.

Another objective of the preferred embodiment of the present invention is to implement ATM traffic on a SONET ring in a manner that may allow better bandwidth management including the ability to handle more connections, the ability to handle connections of variable sizes, the ability to handle "bursty" data transfers, and the ability to allocate bandwidth to connections on an "as needed" basis.

Another objective of the preferred embodiment of the present invention is to provide a more cost effective network.

The preferred embodiment of the present invention relates to the implementation of Asynchronous Transfer Mode (ATM) traffic over a Synchronous Optical Network (SONET) Unidirectional Path Switched Ring (UPSR). The ability to transport ATM traffic on a SONET UPSR combines the flexibility of ATM with the speed and high bandwidth of a SONET. However, unlike standard SONET traffic, ATM cells are transported to destinations based on information in cell headers which forms a virtual path between a present location of the cell on the ring and a destination. For the ATM traffic on the SONET network to be robust, a method for regulating the ATM traffic to prevent loss of ATM cells and notification of the failure of the ATM switches is needed. A Virtual Path Ring (VPR) protection method of the preferred embodiment of the present invention includes the elimination of the standard SONET UPSR bridging mechanism in favor of selection of the ATM cell destination at an ingress to the UPSR ring. The VPR protection mechanism also includes the failure detection and notification methods to implement the ingress selection mechanism.

Thus, a preferred embodiment of the present invention is a VPR protection mechanism that provides for both the detection of failure for ATM VPs and the protection switch for ATM VPs. Failure detection in this context includes both SONET and ATM failures for the portion of the overall system bandwidth that has been allocated to ATM traffic.

In this embodiment, the detection of SONET failures are based on SONET failure alarms and a user defined signal degradation threshold level. SONET alarms are preferably detected within 10 ms. Signal degradation detection time is variable depending on the user defined threshold level. Detection of the ATM failures (VP failures) uses a "hop verification" mechanism to detect downstream failures and verify downstream integrity preferably within 20 ms. For hop verification, a special OAM cell is generated and sent downstream in both the CW and CCW directions from the node, preferably every 5 ms. The downstream VPR nodes identify a failure condition if none of these special OAM cells are received within a 15 ms window.

The protection switch in the preferred embodiment also includes an Intra-Ring Communication (IRC) protocol designed to inform SONET nodes both upstream and downstream of a potential failure as well as to perform the actual protection switch. The IRC protocol also communicates ring status between nodes on the ring and to all line cards within a node. The IRC protocol includes the following functions: assigning logical sequential numbering of nodes on the ring; adding/deleting a node to/from the ring; notifying other nodes on the ring when either a SONET or an ATM failure has been detected; and notifying other line cards in the node when failure occurs. In the present embodiment, the protection switch occurs at the data source and preferably is completed within 20 ms.

The Distributed Access Switch (DAS) node when equipped with the present VPR feature is capable of residing on an SONET UPSR OC-3, OC-3c, OC-12 or OC-12c ring. When on an OC-3 or OC-12 ring, the DAS node is capable of co-existing with major TDM ADM vendor's commercially available nodes. When on an OC-3 ring, the VPR feature supports either one or two STS-1s. Each STS-1 is independent of the other (bandwidth can not be shared between the STS-1s). When on an OC-12 ring, the VPR features supports either one, two or three STS-3c. The STS-3c's are independent of each other (bandwidth can not be shared between the STS-3c). When on an OC-3c or OC-12c ring, only DAS nodes are on the ring. Traffic routed between DAS nodes can be based on the VPI field. Any given VP connection has one source (ingress) into the ring and one destination (egress) from the ring.

In the TDM world, the UPSR is protected by sending traffic in both the CCW (counterclockwise) and the CW (clockwise) direction (commonly known as the bridging function). The destination of the traffic determines which path or virtual tributary to select from (selector function).

The present embodiment is a VPR protection mechanism that does not "bridge" the traffic onto the ring. Instead the direction of the ingress traffic is selected to go either in the CCW or in the CW direction. Comparing this to the standard SONET TDM approach, the "bridging" function is eliminated, and the "selector" function is moved from the egress node to the ingress node. Note that the destination node is configured to accept the cells from both the working and the protection direction. Thus, notification of failure to all nodes is required in this VPR protection mechanism.

In the standard SONET TDM UPSR, it is unnecessary for the nodes on a ring to communicate with each other. Each STS-N or VT will determine which of the two input streams to select from using a Circular Redundancy Check (CRC) mechanism. This approach is not feasible with ATM traffic because it would be necessary to implement a CRC mechanism that generates a checksum at the source of the data transmission and verifies the checksum at the destination of the data transmission. This CRC mechanism would need to be done for each VP. In addition to the hardware complexity, this would waste ring bandwidth by adding a great deal of overhead that would have to be transmitted along with the data transmission. Thus, instead of utilizing the UPSR CRC mechanism, the preferred embodiment of the present invention detects the failure and then communicates the failure information to the other nodes on the ring.

These and other features of the present invention are discussed or apparent in the following detailed description of the preferred embodiment of the present invention.

BRIEF DESCRIPTION OF THE DRAWINGS

FIG. 1 illustrates an exemplary SONET Unidirectional Path Switched Ring (UPSR) Virtual Path Ring (VPR)

according to the method of the preferred embodiment of the present invention;

FIG. 5 is an exemplary table of the information fields of an entry in the tables of FIG. 4 according to the preferred embodiment of the present invention;

DESCRIPTION OF THE PREFERRED EMBODIMENTS

Figure 1:
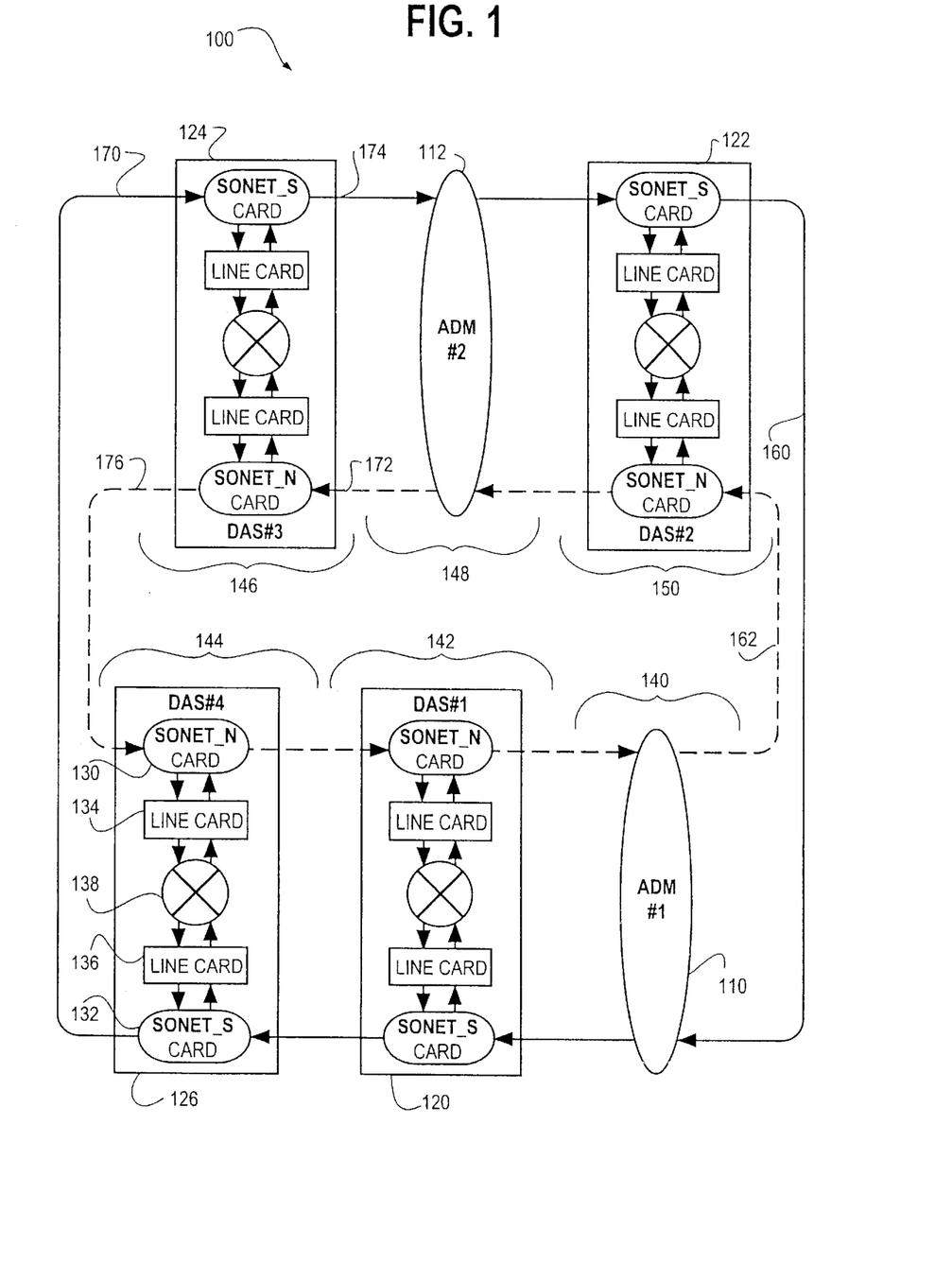

FIG. 1 illustrates a SONET VPR protection method and apparatus according to a preferred embodiment of the present invention. An exemplary SONET UPSR 100, includes two Time Division Multiplexer (TDM) Add Drop Multiplexers (ADM) labeled ADM#1 and ADM#2, numbered 110 and 112, respectively. The exemplary SONET UPSR 100 also includes four Distributed Access Switches (DAS) labeled DAS#1, DAS#2, DAS#3, and DAS#4, and numbered 120, 122, 124, and 126, respectively. Each DAS 120–126, for example DAS#4 126, includes a SONET_N card 130, a SONET_S card 132, two Line Cards 134 and 136, and an electronic switch 138.

Both the ADMs 110–112 and the DASs 120–126 are generally referred to as SONET nodes 140–150 because they are in communication via the SONET UPSR 100. The physical connections between the SONET nodes 140–150 form two rings, one ring with a signal transmission direction in the clockwise (CW) direction 160 and the other ring with a signal transmission direction in the counter clockwise (CCW) direction 162. Each ring 160–162 carries optical signals from one node to the next. The CW ring 160 connects in rotating sequence DAS#2 122, ADM#1 110, DAS#1 120, DAS#4 126, DAS#3 124, and ADM#2 112 which connects to DAS#2 122 to complete the ring. The CCW ring 162 connects in rotating sequence DAS#2 122, ADM#2 112, DAS#3 124, DAS#4 126, DAS#1 120, and ADM#1 110 which connects to DAS#2 122 to complete the ring. Thus, each SONET node 140–150 receives signals via two input ports and transmits signals via two output ports. For example, the SONET node 146 comprised of DAS#3 124 receives a CW input signal 170 from the CW ring 160 and a CCW input signal 172 from the CCW ring 162. Also, the SONET node 146 comprised of DAS#3 124 transmits a CW output signal 174 onto the CW ring 160 and a CCW output signal 176 onto the CCW ring 162.

Signals transmitted on the CCW ring 162 are received by the DAS#4's 126 SONET_N card 130 which transforms the optical signal carried on the CCW ring 162 into an electrical signal and then transmits the electrical signals to the line card 134. The line card 134 formats the electrical signal for transmission to the electronic switch 138 and then transmits the signal to the electronic switch 138.

The electronic switch 138 either 1) "continues" the traffic to DAS#1 120 or 2) "drops" the traffic off the ring. If the traffic is continued, the traffic passes from the electronic switch 138 to the line card 134. The line card 134 formats the traffic and passes the traffic to DAS#4's SONET_N card 130 where the traffic to transformed from an electrical signal to an optical signal. The optical signal is then passed from DAS#4's SONET_N card 130 to DAS#1 120. If the traffic is dropped, then the traffic is not passed to DAS#1 120.

Signals transmitted on the CW ring 160 are received by the DAS#4's 126 SONET_S card 132 which (like the SONET_N card 130 for the CCW ring 162) transforms the optical signal carried on the CW ring 160 into an electrical signal and then transmits the electrical signals to the line card 136. The line card 136 formats the signal for transmission to the electronic switch 138 and transmits the electric signal to the electronic switch 138. As above, the electronic switch 138 either continues the traffic or drops the traffic off the ring. Here, the traffic continued by the electronic switch 130 passes to DAS#3 124.

The optical connections of the CW ring 160 and the CCW ring 162 are not constrained to be any specific throughput (such as OC-1/STS-1 to OC-48/STS-48) because the specific data transfer rate is not essential to the preferred embodiment of the present invention. The preferred embodiment may be scaled to any data transfer rate. In the SONET UPSR 100, each DAS node 120–126 is given a sequential logical node number around the ring. Each connection between SONET nodes 140–150 (DASs and ADM) originates at a transmitting node and is terminated at a receiving node, thus each node provides line termination.

The preferred embodiment of the present invention may utilize an Intra-Ring Communication (IRC) Protocol. The IRC protocol provides for: 1) adding a SONET node to the ring, 2) deleting a SONET node from the ring, 3) communicating ring failure (status) to the other SONET nodes on the ring, and 4) communicating ring failure (status) to all line cards in a SONET node or system.

Figure 2:
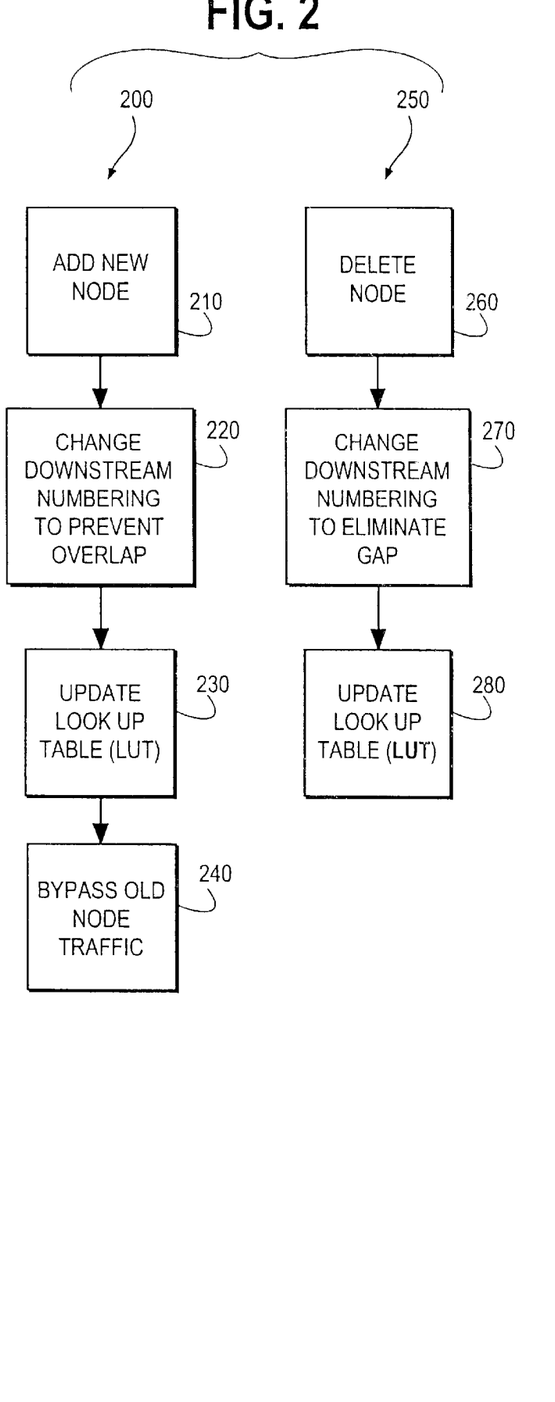
FIG. 2 illustrates flowcharts for adding and deleting a SONET node from a SONET ring according to a preferred embodiment of the present invention.

First, the IRC protocol for adding a node to the ring and the IRC protocol for deleting a node from the ring will be explained. As illustrated in FIG. 2, when adding a new SONET node 200 or deleting an existing SONET node 250, the IRC mechanism of the preferred embodiment performs the following steps. The process for adding a new node to the ring 200 begins with the physical connection of the new node to the ring 210. Second, the logical numbering of each node in the downstream direction from the added node (on both the CW and CCW rings) is changed 220. This numbering is changed because the SONET nodes are numbered sequentially. Next, the Look-Up Tables (LUTs) of each SONET node are updated 230 to reflect the new sequential numbering. However, a newly added SONET node may take a sequential number that had been previously assigned to another node. In that case, all traffic destined for the replaced SONET node is configured to by-pass 240 the added SONET node and travel to the intended node.

The process for deleting a node from the ring 250 begins with the physical elimination of the new node from the ring 260. Second, the logical numbering of each node in the downstream direction from the deleted node (on both the CW and CCW rings) is changed 270. As above, this numbering is changed because the SONET nodes are numbered sequentially and a numeric gap may interfere with communication. Finally, the LUTs of each SONET node are updated 280 to reflect the new sequential numbering.

The updating of the LUTs is accomplished so that previously configured VPs are able to either bypass the newly added SONET node (if a node has been added) or are eliminated if destined for a deleted SONET node. Simply bypassing all VPs does not work because of the potential problem that could arise if an ATM cell is accidentally inserted into the ring with an unused VP. The accidentally inserted ATM cell would continuously loop around the ring and could potentially burden legitimate traffic utilizing the ring.

The logical numbering of the node is preferably very straightforward. Preferably, the nodes are numbered sequentially in the CCW direction. The first node on the ring is assigned ring identification number one (ID#1). The second node on the ring is assigned ring ID#2. Each subsequent addition will depend on its relative location on the ring. If a node is added between ring ID#n and ring ID#n+1, the new node is assigned ring ID#n+1. All previous nodes with ring ID#n+1 or higher are incremented by 1.

Referring to FIG. 1, each SONET card 130–132 records the ring ID# for that node. For example, when the SONET node 144 comprised of DAS#4 126 is to be deleted, the SONET_N card 130 and SONET_S card 132 for DAS#4 126 broadcast a command to all the other SONET nodes 140–142, 146–150 directing the other SONET nodes to decrement their ring ID#s if their current ring IDs are greater than the ring ID of DAS#4 126, the SONET node that is being deleted. For robustness, each SONET card 130–132 of each SONET node periodically checks to ensure that the ring ID# of the SONET card transmitting data to (and the ring ID# of the SONET Card receiving data from) the SONET card in question is of the next sequential order. In the case of adding or deleting a SONET node from the ring, the change is preferably implemented by an operator and the designation of a SONET node as node ID#1 may be arbitrarily chosen.

The IRC protocol also controls detecting SONET and ATM failures and. communicating SONET and ATM failure both to the other SONET nodes and to the line cards within the SONET nodes. For example, in FIG. 1, in the event that a SONET card 130–132 of DAS#4 126 detects a SONET or an ATM failure, the SONET card 1) notifies the other SONET nodes 140–150 on the ring of the failure, 2) notifies the other line cards 134–136 in the SONET node of the failure, and 3) preferably repeats the failure notification every 10 ms until the. failure is repaired. In the event that one of the SONET cards 130–132 of DAS#4 126 detects a failure notification from a SONET card of another SONET node, the receiving SONET card 130–132 notifies the other line cards 134–136 in DAS#4 126 of the failure.

Notification of failure is sent from the detecting SONET node (for example, DAS#4 126) in both the "upstream" and "downstream" directions relative to the detecting SONET node. The failure notification is sent on both the CW and CCW rings 160, 162. The failure notification includes both the node on the ring detecting the failure and the direction of failure (i.e., CW or CCW path). The detecting node's identification and failure direction is used by the protection switch mechanism. The failure notification is passed beyond the adjacent upstream and downstream nodes and reaches all DAS nodes 120–126 on the SONET UPSR 100.

Although not essential, the UPSR preferably maintains ring statistics on a per VP basis. The statistics preferably include the duration of failure condition (for the last hour and for the last 24 hours) and the number of protection switches (for the last hour and for the last 24 hours).

Once the SONET nodes have been notified of a failure via the IRC protocol, a protection switch is performed. The most conceptually straightforward way to perform. protection switching would be to sequentially update the LUT contents for all affected VPs. That is, once notified of failure, the SONET nodes would determine which VPs are affected and then update the LUTs. However, as mentioned above, this approach is not feasible since there are 32K entries in the LUT and the time to update 32K entries is prohibitively long. Also, as mentioned above, adding complexity to the problem is the multi-ring scenario, the need to know the ring's current topology, and the processing needed to determine if any particular VP is effective.

Figure 3:
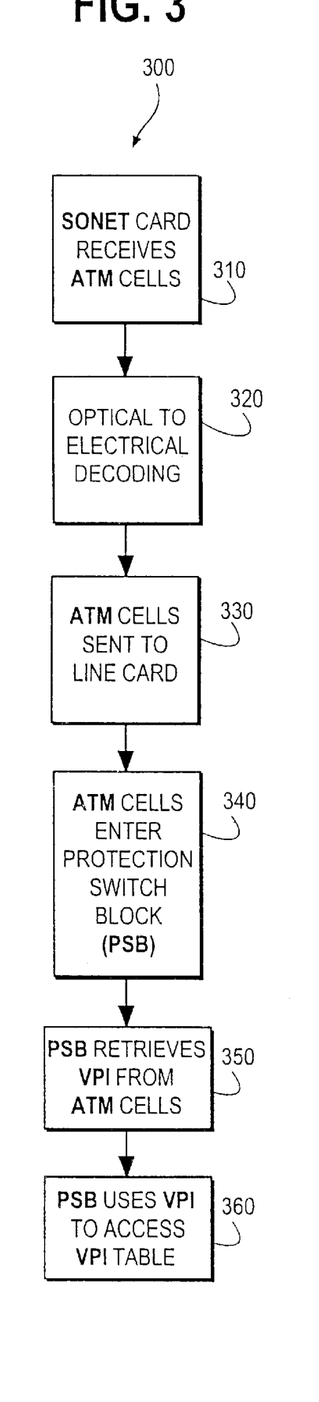
FIG. 3 illustrates a flowchart for implementing a protection switch according to a preferred embodiment of the present invention.

As shown in FIG. 3, the preferred embodiment described below represents a protection switching method 300 that overcomes the shortcomings of the straightforward approach. First, the ATM traffic carried by the UPSR is received by the SONET card 310 (either a SONET_S Card if th e ATM traffic is carried on the CW ring, or a SONET_N Card if the ATM traffic is carried on the CCW ring). The SONET card decodes the optical transmission 320 and sends the corresponding electrical signals to the line card 330. At the line card, the transmitted ATM cells are intercepted. by a Protection Switch Block 340 preferably consisting of a ASIC or PLD and 164 Kbyte of SRAM.

The Protection Switch Block strips off the first four octets of each ATM cell header including the VPI (Virtual Path Identifier) field 350. Preferably, the Protection Switch Block then uses the 12 bit VPI field to access an external memory and retrieve up to five bytes of information from a 4096X(n) byte table called the VPI table 360. The Protection Switch Block also adds one cell delay at the ingress to each node.

Figure 4:
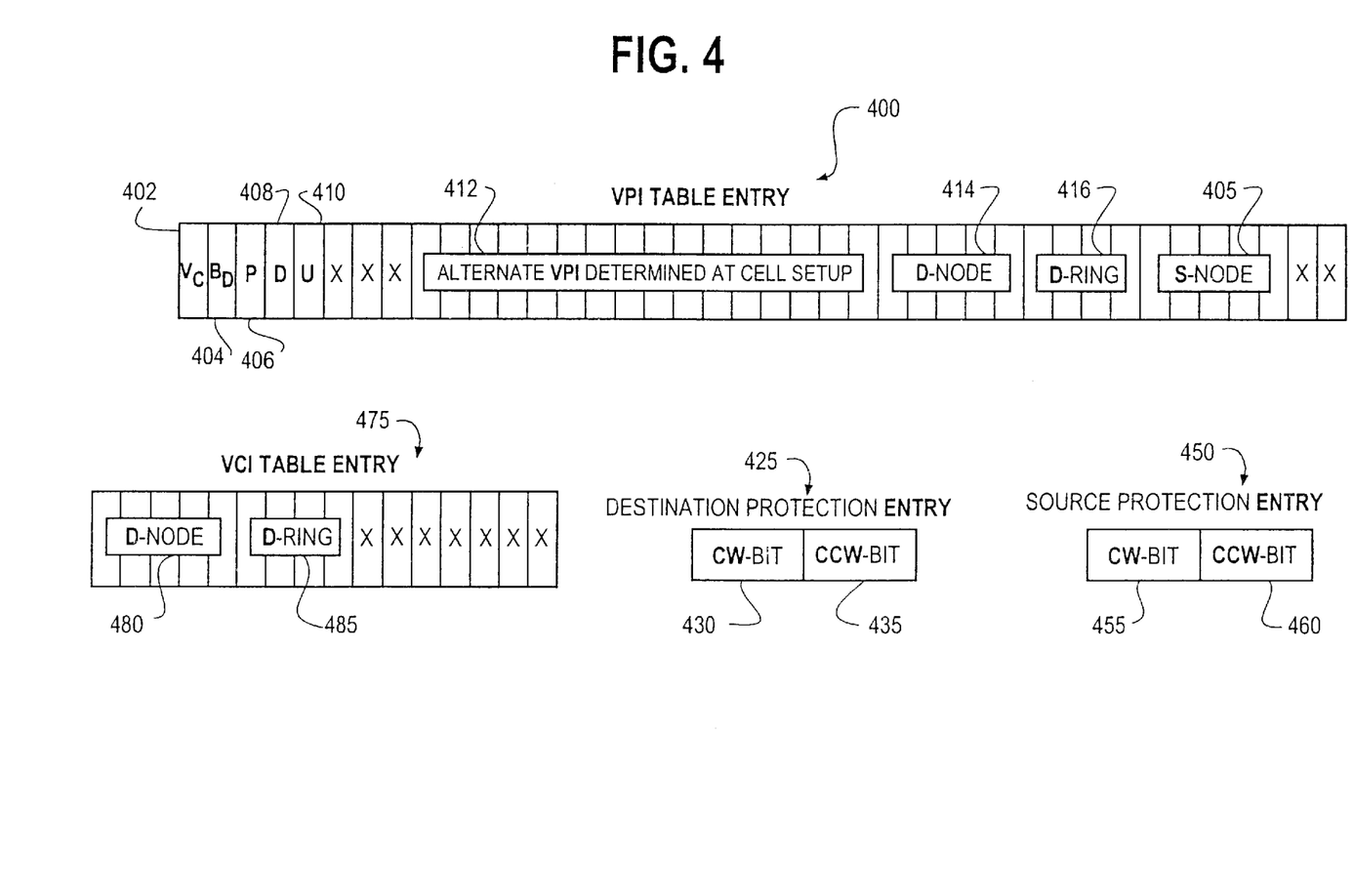
FIG. 4 illustrates a Virtual Path Identifier (VPI) table entry, an exemplary Virtual Circuit Identifier (VCI) table entry, an exemplary destination protection table entry, and an exemplary source protection table entry according to the preferred embodiment of the present invention.

FIG. 4 illustrates an exemplary entry 400 in the preferred VPI table, an exemplary entry in the Destination Protection Table 425, an exemplary entry in the Source Protection Table 450, and an exemplary entry in the VCI Table 475. The VPI table entry 400 contains the following information fields. The Vc bit 402 is used to select either VP protection or VC protection. The Vc bit 402 selects whether the VP of the present ATM cell is terminated at a single egress point on the ring or is terminated at each DAS node on the ring. The Bd bit 404 controls the broadcast drop of the UPSR. The Bd bit 404 indicates whether the given ATM cell is on a broadcast VP. When the Bd bit 404 is set, the S_node field 405 is used to determine which direction will be selected for dropping the ATM cell. In this fashion, the Bd bit 404 is roughly equivalent to the selector function in the traditional TDM UPSR. The P bit 406 indicates whether the ATM cell is in a protected mode. The protected mode bit 406 is set when the cell is destined for a ring or for broadcast VPs on the ring. The U bit, 410 short for unprotected class of service, is reserved for a future enhancement such as utilizing the protection bandwidth to carry extra traffic in the absence of ring failures. The D bit 408, short for direction, is the working direction when not affected by a ring failure. The working direction can be craft configurable. This direction determines which protection table entry bit is considered first, the CCW bit or the CW bit. The Alternate VPI field 412 is the replacement VPI (protection VPI) that will be substituted for the original VPI in the event that the preferred route is blocked due to a ring failure. The D__node field 414 is the destination node within the UPSR ring in which the VPI/VCI combination terminates. The D__ring field 416 is the destination ring that the ATM cell will be sent on. The S__node field 405 is the source node of the ATM cell and is used to determine which direction to drop the cell from.

The VCI table entry 475 contains the following information fields. Similar to the VPI table entry 400, the D__node field 480 is the destination node within the UPSR ring in which the VPI/VCI combination terminates. The D__ring field 485 is the destination ring that the ATM cell will be sent on.

The destination protection table 425 contains CW-bit 430 (clockwise) and CCW-bit 435 (counter-clockwise) information fields. The CW-bit 430 indicates the failure status for a given destination in the CW direction. The CCW-bit 435 indicates the failure status for a given destination in the CCW direction.

The source protection table 450 also contains CW-bit 455 (clockwise) and CCW-bit 460 (counter-clockwise) information fields. The CW-bit 455 indicates the failure status for a given source in the CW direction. The CCW-bit 460 indicates the failure status for a given source in the CCW direction.

The names of the various information fields, as well as a brief description and comments, are summarized in FIG. 5.

The Vc bit 402 is used to determine if the ATM cell (based on VPI/VCI) uses VP or VC protection. The ATM cell uses VP protection if all ATM cells of the VP have a single ingress and a single egress point from the ring. The ATM cell uses VC protection if the VP is terminated at each hop around the ring.

If the ATM cell is protected by VP, the D-node 414 and D-ring 416 data from the VPI table 400 are used to index the destination protection table 425 containing 2 bits for each of the possible combinations of up to 15 destination rings and up to 32 destination (egress) nodes within a destination ring. If the ATM cell is protected by a VC, a the VCI table 475 is accessed via direct map of the VCI in the VPI/VCI combination. The VCI table 475 contains the D-Node 480 and D-ring 485 data for that particular VCI. This data is used to index the same destination protection table as used by the protected VP.

The Destination Protection table 425 preferably is within the PLD or ASIC. It contains two bits which show if the CCW 435 and CW 430 sides of the destination ring have failures. The direction specified by the Direction bit 408 in the VPI table 400 is used if that direction is not blocked. In this case the original 5 octet ATM cell header is passed on unchanged. If the direction specified by the direction bit 408 is blocked, the opposing direction is checked. If the opposing direction is not blocked, the alternate VPI 412 which was configured at call set-up is substituted for the original VPI. The HEC is then recalculated and the new header containing the alternate VPI 412 and correct HEC is passed to the UPC. If both directions are blocked, the cell is discarded.

On the egress (from the ring) VPR module, the VPR SONET card checks the broadcast drop bit 404. This bit indicates if this VPI/VCI's cell should be "dropped & continued" or just "continued." The conceptual idea is that only one of the two SONET cards in the VPR pair drops the cell. In order to determine which direction is used to drop the cell, S__Node data 405 from the VPI table 400 is used to index the source protection table 450 which contains 2 bits for each of the possible source nodes. Broadcasting is accomplished by bridging (multicast) at the source node and the source protection table. Note that the last destination node of the broadcast will either "drop" or "discard" the cell. This can also be used to implement "dual homing rings" similar to the "drop & continue" approach used in the TDM world.

The present approach requires that the line card initialize five bytes within the VPI table 400 during call setup. For all VPs destined to a ring node, two paths are configured; one in the working direction and one in the protection direction. Note that the working direction for any given VP can be in either the CW or the CCW direction. The LUT within the line card is updated when notified of ring failure via the IRC protocol.

Turning again to the exemplary SONET UPSR in FIG. 1, each DAS node 120–126 has several functions. First, when a SONET Card (SONET__S 132 or SONET__N 130) detects a failure, the DAS node notifies all other DAS nodes on the ring of the failure via the IRC protocol. Failure notification occurs in both the downstream and upstream (relative to failure) directions. The DAS node also inserts a Path Alarm Indication Signal (AIS-P) on all downstream STS-Ns that are not configured for ATM traffic. Second, when a SONET Card detects an AIS-P on any incoming STS-N that is configured for TDM traffic, the AIS-P is passed through by the DAS node. If the STS-N is configured for ATM traffic, the DAS node notifies the other DAS nodes on the ring of the failure via the IRC protocol. Failure notification occurs in both the downstream and upstream (relative to failure) directions. Third, the SONET card monitors the BER for all paths (for example, STS-1, STS-3c, & STS-12c). The path BER threshold is configurable externally. If the threshold is exceeded, an AIS-P is inserted if the failing STS-N is configured for TDM traffic. If the failing STS-N is configured for ATM traffic, the DAS node notifies the other DAS nodes on the ring of the failure via the IRC protocol.

In the exemplary embodiment of FIG. 1, communication failures may be broadly grouped as SONET failures and ATM failures. SONET failures include SONET section or line failures at various points in the ring and path AIS-Ps at various points in the ring. ATM failures include, for example, SONET card failures, line card failures and switch model failures. Although a standard SONET TDM UPSR network may experience and repair some SONET failures as part of its normal operation, these method of dealing with these SONET failures must be changed to take into account the ATM traffic on the SONET ring. ATM failures, of course, only arise through the use of ATM traffic.

Figure 6:
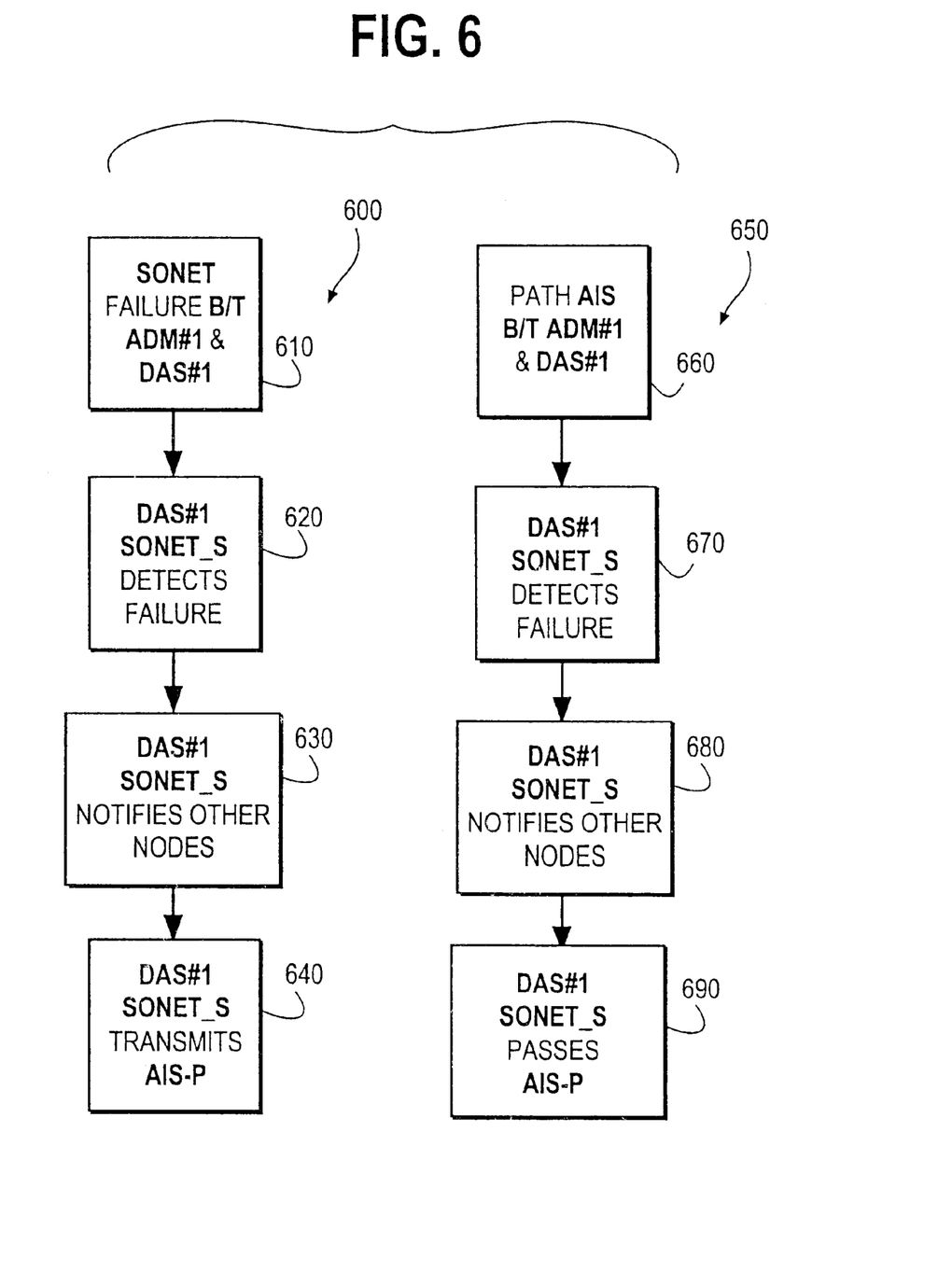
FIG. 6 illustrates flowcharts for the response of the UPSR according to a preferred embodiment of the present invention for exemplary SONET failures and path AIS-Ps.

SONET failure scenarios include, for example:

First, as illustrated in FIG. 6, if there is a SONET section or line failure 600 (for example a loss of signal) between ADM#1 110 and DAS#1 120 in the CW 160 direction, the SONET__S on DAS#1 120 detects 620 the failure (recognizes that the signal has been lost) and notifies 630 the other DAS nodes via the IRC protocol. The DAS#1 120 SONET__S also transmits 640 an AIS-P on all out-going STS-n that are configured for TDM traffic instead of ATM traffic. The DAS#4 126 and DAS#3 124 pass the AIS-P through to the ADM#2 112. ADM#2 112 then performs the protection switch if it is the exit node for that particular STS-N.

Second, if there is a path AIS (AIS-P) 650 from ADM#1 110 to DAS#1 120 in the CW 160 direction, the SONET_S on DAS#1 120 detects 670 the AIS-P and notifies 680 the other DAS nodes via the IRC protocol if the path is configured for ATM traffic. If the path is not configured for ATM traffic, the SONET_S on DAS#1 120 passes 690 the AIS-P signal along. The other paths are not affected.

Figure 7:
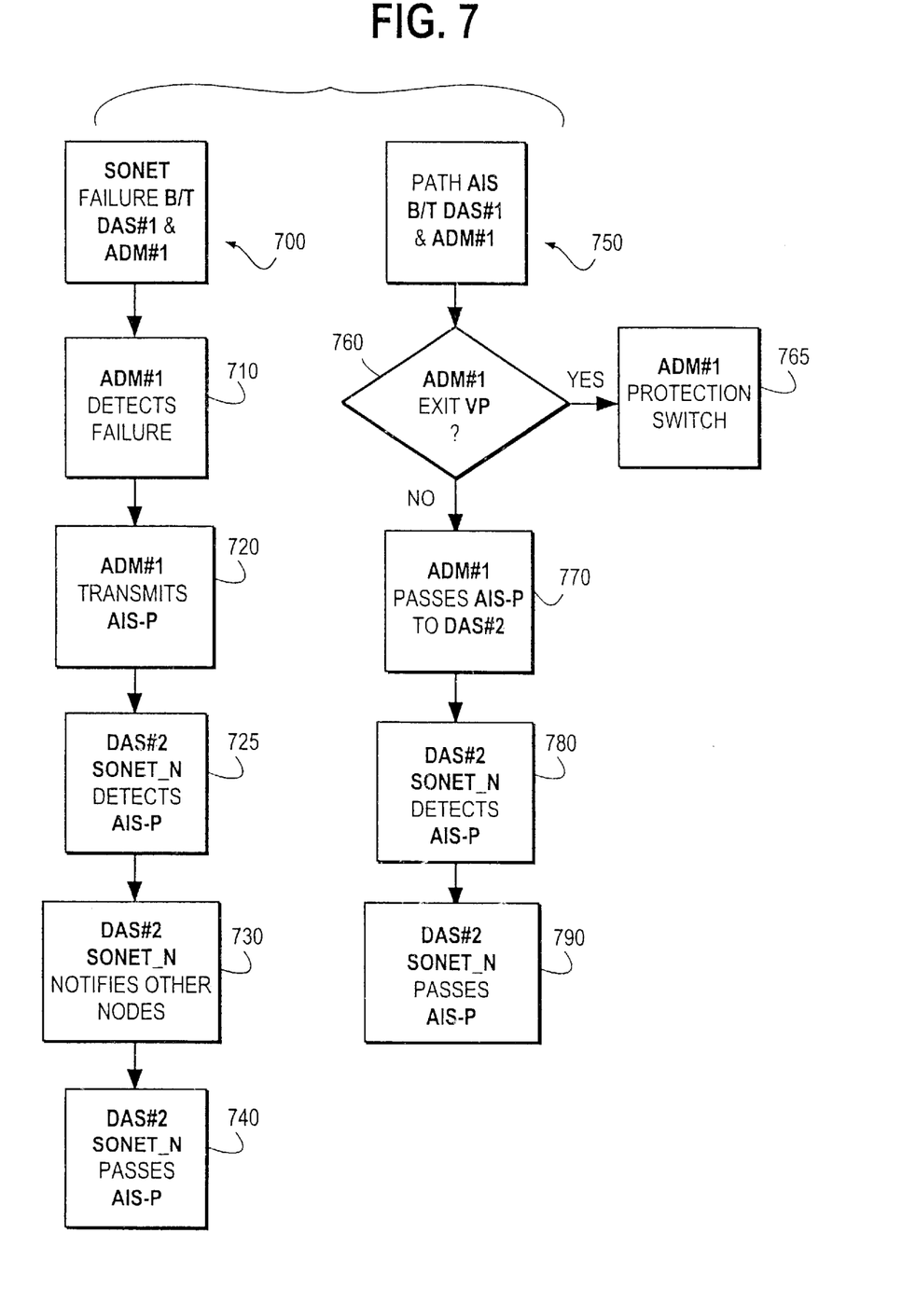
FIG. 7 illustrates flowcharts for the response of the UPSR according to a preferred embodiment of the present invention for further exemplary SONET failures and path AIS-Ps.

Third, as illustrated in FIG. 7, if there is a SONET section or line failure 700 between DAS#1 120 and ADM#1 110 in the CCW 162 direction, the ADM#1 110 detects 710 the failure and transmits 720 an AIS-P on the STS-Ns that proceed from ADM#1 110 toward DAS#2 122. The SONET_N on DAS#2 122 detects 725 the AIS-P and notifies 730 the other DAS nodes via the IRC protocol. The SONET_N on DAS#2 122 also passes 740 through any AIS-P on the STS-Ns that are carrying TDM traffic.

Fourth, if there is a path AIS (AIS-P) 750 from DAS#1 120 to ADM#1 110 in the CCW 162 direction, the ADM#1 110 determines 760 if the AIS-P occurs on a VP that is destined to exit at ADM#1 110. If so, then ADM#1 110 performs a protection switch 765. If it is not, then ADM#1 110 passes 770 the AIS-P on to DAS#2 122. Then the SONET N on DAS#2 122 detects 780 the AIS-P and propagates 790 the AIS-P. The AIS-P is propagated because the AIS-P would not be on an STS-N configured for ATM traffic (or else the VP would have been destined to exit at ADM#1 5). Other paths are not affected.

Figure 8:
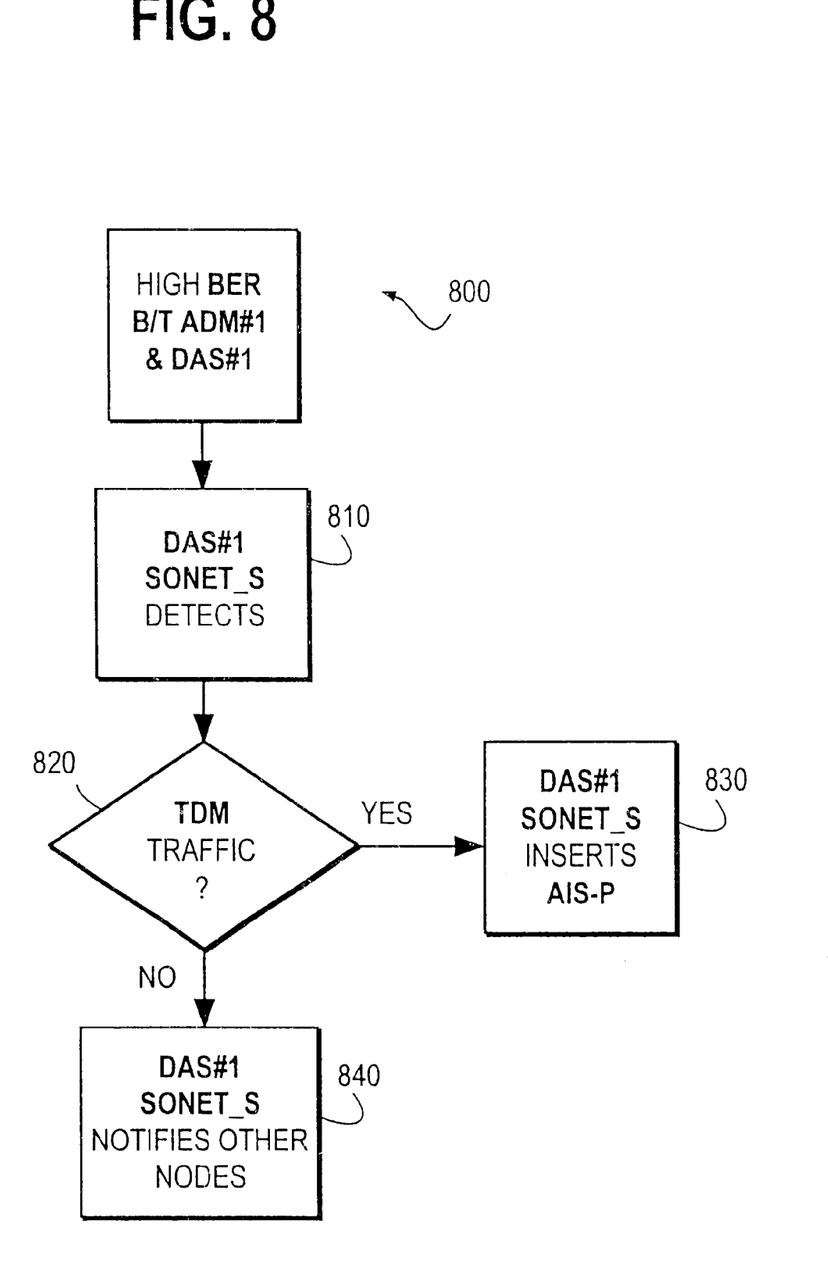
FIG. 8 illustrates a flowchart for the response of the UPSR according to a preferred embodiment of the present invention for a high BER communications link.

Fifth, as shown in FIG. 8, if there is a high bit error rate (BER) 800 on any STS-N from ADM#1 110 to DAS#1 120 in the CW 160. direction, the SONET_S on DAS#1 120 determines 810 when the user configured threshold has been exceeded. When an STS-N is exceeding the threshold. if the STS-N that is exceeding the threshold is carrying TDM traffic 820, the SONET_S inserts 830 an AIS-P onto the appropriate STS-N. If an STS-N is exceeding the threshold, and if the STS-N that is exceeding the threshold is not carrying TDM traffic (for example, ATM traffic) 820, then the SONET_S on DAS#1 120 notifies 840 the other DAS nodes via the IRC protocol. Other paths are not affected.

Figure 9:
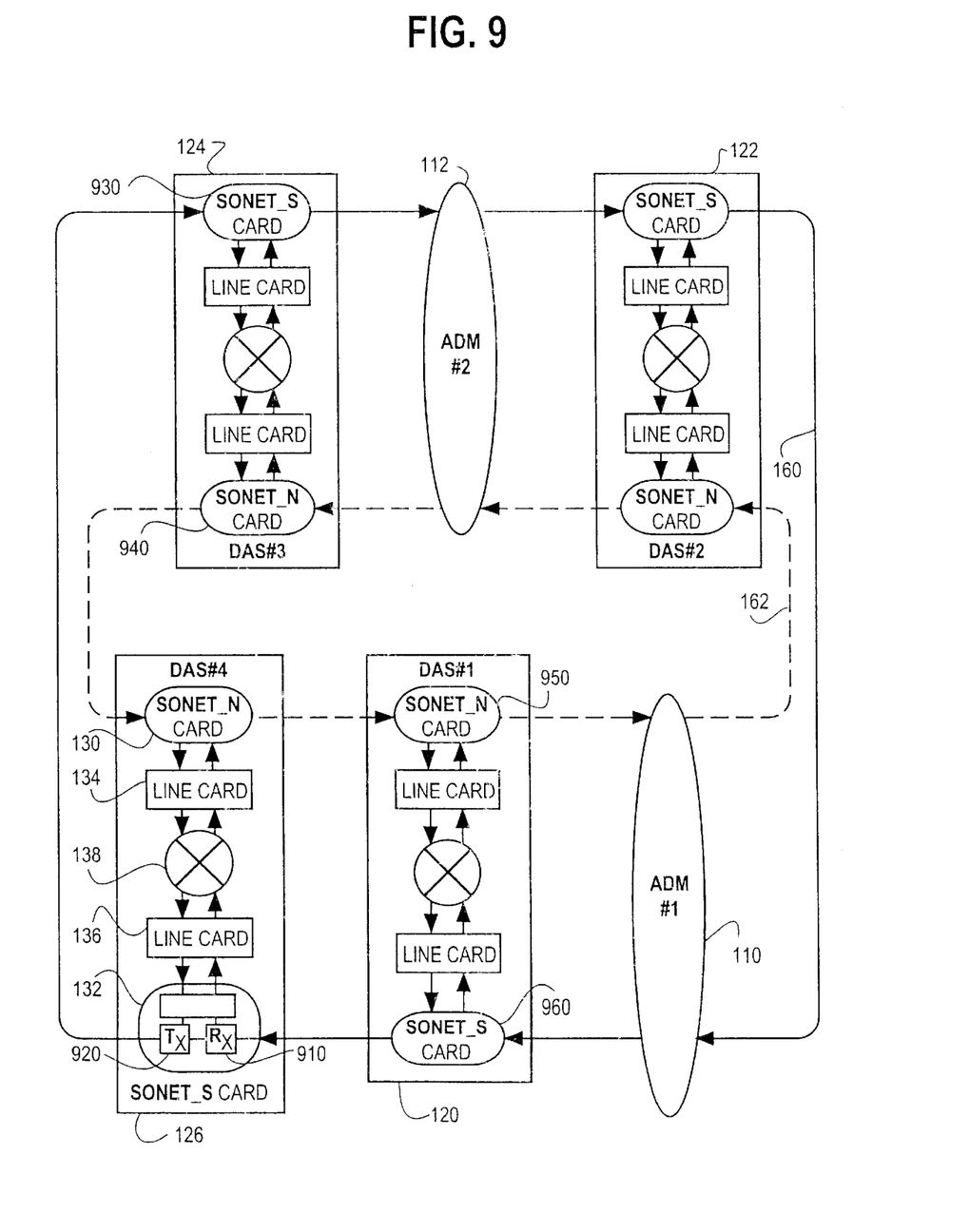
FIG. 9 illustrates the exemplary SONET UPSR VPR of FIG. 1 with a more detailed view of a SONET_S Card according to the preferred embodiment of the present invention.

FIG. 9 is an illustration of the exemplary SONET UPSR VPR of FIG. 1 with a more detailed view of a SONET_S Card which shows the separate receive and transmit portions of the SONET_S card. In FIG. 9, the SONET_S card 132 of DAS#4 126 has both a receive portion 910 and a transmit portion 920. The receive portion 910 receives optical signals from the CW ring 160, transforms the received optical signals carried by the CW ring 160 into electrical signals, and then transmits the electrical signals to the line card 136. The transmit portion 920 receives electrical signals from the line card 136, transforms the received electrical signals from the line card 136 into optical signals, and then transmits the optical signals to the CW ring 160. All SONET_S and SONET_N cards have identical internal structures, consequently only one SONET card need be examined to illustrate the functionality of all SONET cards.

Turning again to FIG. 9, as in FIG. 1, all DAS nodes on the ring are given a logical node number that is sequential around the ring. In FIG. 4, DAS#4 126 has been detailed out for the purpose of explaining the ATM failure direction mechanism. As in FIG. 1, for each DAS node 120–126, there is a SONET_S card in the CW 160 direction and a SONET_N card in the CCW 162 direction.

In addition to the functions described above, each DAS 120–126 performs the following. First, preferably every 5 ms, each SONET card transmits a notification signal downstream to verify the integrity of the ATM layer. Note that each SONET card of the SONET node pair transmit a notification signal in opposite directions, thus a notification signal is sent in both the CW and CCW direction. Second, each SONET card receives a notification signal from its upstream neighbor, again preferably every 5 ms. Third, if no notification signal is received within 15 ms, then the SONET card identifies that a failure has occurred and notifies the other SONET nodes on the ring of the failure via the IRC protocol.

ATM failure scenarios include, for example:

First, if there is SONET card failure. A SONET card failure can occur in either the receive portion 910 of the SONET card, the transmit portion 920 of the SONET card or both the receive and transmit portions 910–920 of the SONET card.

Figure 10:
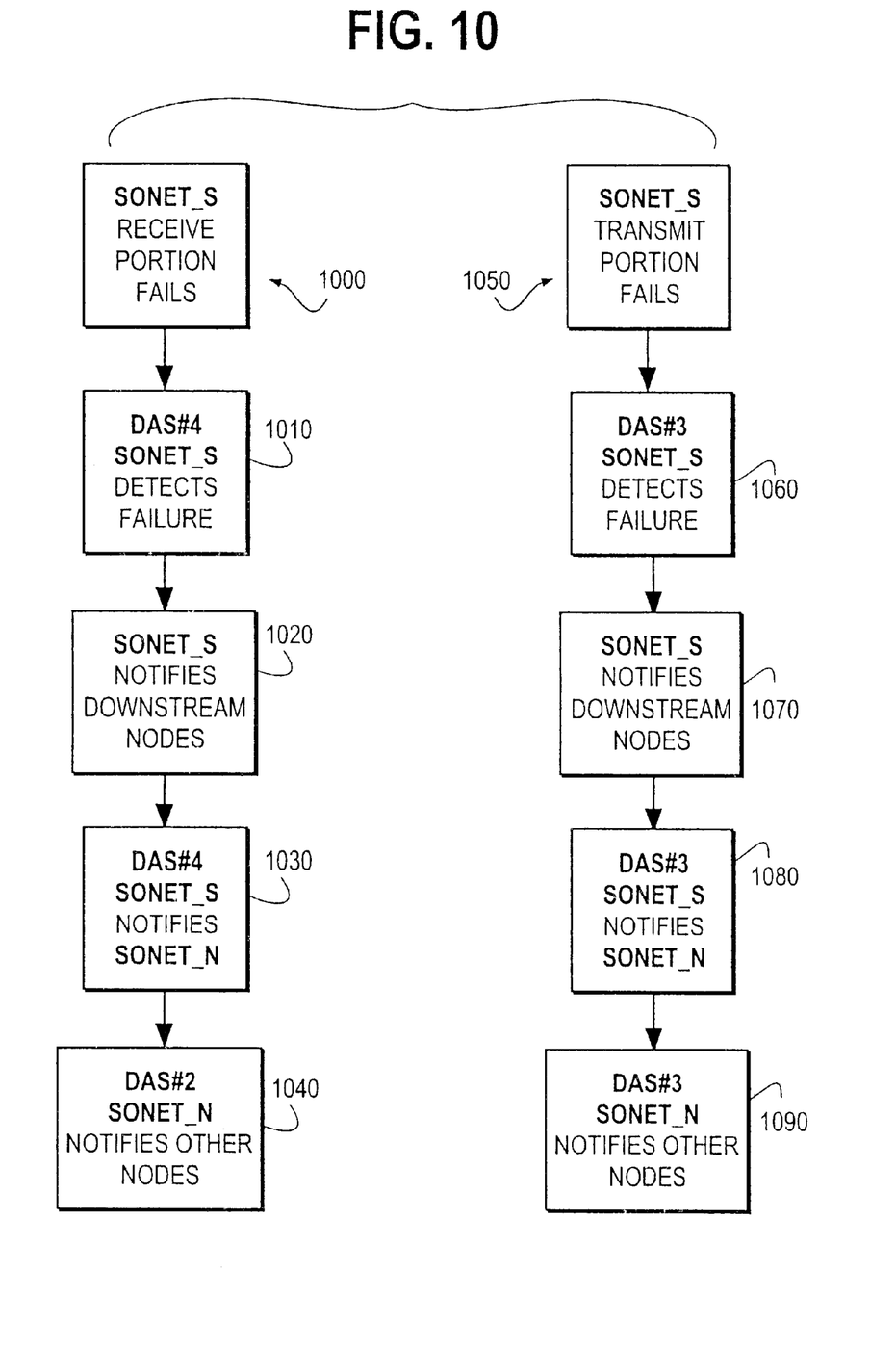
FIG. 10 illustrates flowcharts for the response of the UPSR according to a preferred embodiment of the present invention for exemplary SONET card failures.

As illustrated in FIG. 10, if the receive portion 910 of the SONET_S card 132 fails 1000 (ceases to function correctly), a communication failure between the DAS#1 120 and the DAS#4 126 occurs. The DAS#4 126 detects 1050 the failure and notifies 1020 the SONET nodes that are downstream on the CW ring 160 via the IRC. The SONET_S Card 132 also notifies 1030 the SONET_N card 130 within the DAS#4 126. The SONET_N card 130 then notifies 1040 all the SONET nodes on the CCW ring 162 via the IRC.

If the transmit portion 920 of the SONET_S card 132 fails 1050, a communication failure between the DAS#4 126 and the DAS#3 124 occurs. The DAS#3 124 SONET_S card 930 detects 1060 the failure and notifies 1070 the SONET nodes that are downstream on the CW ring 160. The DAS#3 124 SONET_S 930 also notifies 1080 the SONET_N card 940 within the DAS#3 124. The SONET_N card 940 within the DAS#3 124 then notifies 1090 all the SONET nodes on the CCW ring 162.

If both the transmit portion 910 and the receive portion 920 of the SONET_S card 132 fail, the DAS#4 126 and the DAS#3 124 both detect the failures. This is a simultaneous failure 1000–1050 of both the receive portion 910 and the transmit portion 920 of the SONET_S card 132, thus both the transmit portion failure procedure described above and the receive portion failure procedure described above take place. Thus, the DAS#3's 124 SONET_S card 930 detects a failure and notifies the downstream nodes on the CW ring 160. The DAS#3's 124 SONET_S card 930 also notifies the DAS#3's 124 SONET_N card 940 of the failure. The DAS#3's 124 SONET_N card 940 then notifies all SONET nodes on the CCW ring 162 of the failure. Also, the DAS#4's 126 SONET_S card 132 detects the failure and notifies the downstream nodes on the CCW ring 162. The DAS#4's 126 SONET_S card 132 also notifies the DAS#4's 126 SONET_N card 130 of the failure and the DAS#4's 126 SONET_N card 130 then notifies all SONET nodes on the CW ring 160 of the failure. The nodes receiving the failure notification perform the appropriate protection switch.

Figure 11:
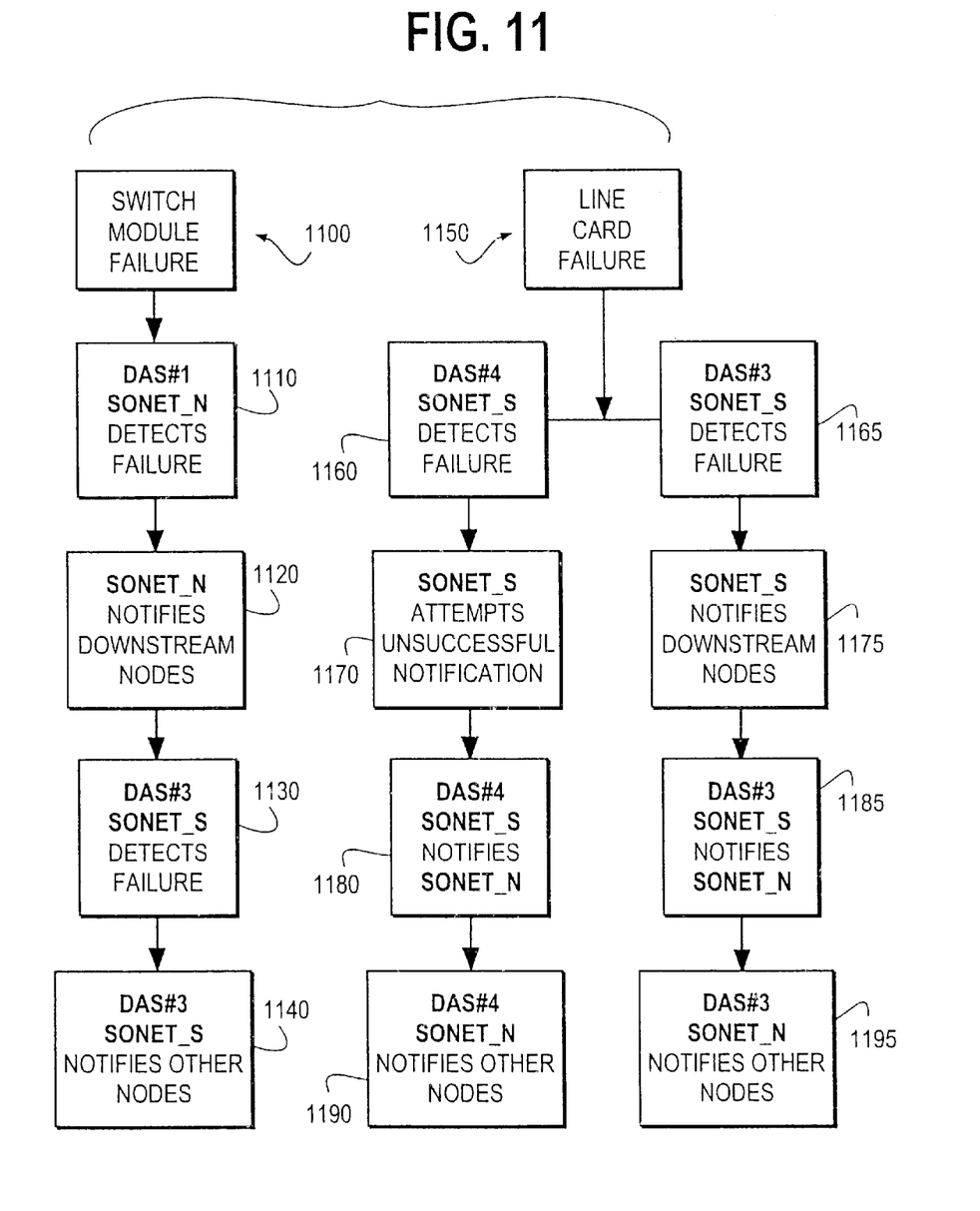
FIG. 11 illustrates flowcharts for the response of the UPSR according to a preferred embodiment of the present invention for exemplary switch module failures and line card failures.

Second, when there is a complete SONET switch module failure 1100, such as the complete failure of the DAS#4 126. For example, the failure of the DAS#4 126 causes a communication failure in the DAS#4's 126 SONET_N card 130, the DAS#4's 126 SONET_S card 132, the DAS#1's 120 SONET_N card 950, and the DAS#3's 124 SONET_S card 930. All links into and out of the DAS#4 126 are treated as failed. When the DAS#4 126 fails, the DAS#1's 120 SONET_N card 950 detects 1110 the failure and notifies 1120 the downstream nodes on the CCW ring 162. The DAS#3's 124 SONET_S card 930 also detects 1130 the failure and notifies 1140 the downstream nodes on the CW ring 160.

Although the DAS#1's 120 SONET_N card 950 notifies the DAS#1's 120 SONET_S card 960 and the DAS#1's 120 SONET_S card 960 transmits a failure notification in the CW ring 160 direction, the failure notification from the DAS#1's 120 SONET_S card 960 is not transmitted by the DAS#4 126 in the CW ring 160 direction because of the failure of the DAS#4 126. Also, although the DAS#3's 124 SONET_S card 124 notifies the DAS#3's 124 SONET_N card 940 and the DAS#3's 124 SONET_N card 940 transmits a failure notification in the CCW ring 162 direction, the failure notification from the DAS#3's 124 SONET_N card 940 is not transmitted by the DAS#4 126 in the CCW ring 162 direction because of the failure of the DAS#4 126.

Third, when there is a line card failure 1150 within a SONET node. For example, if the line card 136 within the DAS#4 126 fails, the DAS#4's 126 SONET_S card 132 and the DAS#3's 124 SONET_S card 930 detect 1160–1165 the failures in the CW ring 160 between the DAS#1 120 and the DAS#4 126 and between the DAS#4 126 and the DAS#3 124. The DAS#3's 124 SONET_S card 930 detects the failure 1165 and notifies 1175 the downstream SONET nodes on the CW ring 160. Also, the DAS#3's 124 SONET_S card 930 notifies 1185 the DAS#3's 124 SONET_N card 940 and the DAS#3's 124 SONET_N card 940 then notifies 1195 the downstream SONET nodes on the CCW ring 162.

Also, the DAS#4's 126 SONET_S card 132 detects 1160 the failure and attempts to notify 1170 the downstream SONET nodes on the CW ring 160 of the failure. This failure notification is not successful because the DAS#4's 126 line card 136 has failed. However, the DAS#4's 126 SONET_S card 132 notifies 1180 the DAS#4's 126 SONET_N card 130 and the DAS#4's 126 SONET_N card 130 notifies 1190 the downstream SONET nodes on the CCW ring 162.

Although the present invention has been described with reference to specific embodiments, those of skill in the art will recognize that changes may be made thereto without departing from the scope and spirit of the invention as set forth in the appended claims.

What is claimed is:

1. A Virtual Path Ring VPR protection method for Asynchronous Transfer Mode ATM traffic carried over a Synchronous Optical Network SONET Unidirectional Path Switched Ring UPSR, each ATM cell traveling along a Virtual Path VP connection from ingress to egress on the UPSR ring, said SONET UPSR including at least two SONET VPR nodes, each SONET VPR node including at least one SONET card, wherein said SONET UPSR includes at least one Synchronous Transport Signal-N STS-N, comprising:

directing one of said ATM cells incoming to said SONET UPSR to a destination via said VP connection; and protecting said VP connection by an Intra-Ring Communication protocol, said protecting step comprising:

identifying a Bit Error Rate BER of an STS-N communication link;

collecting statistical information on the BER of said communication link;

comparing said statistical information to a predetermined BER threshold; and when a high BER occurs on said communication link, inserting an Path Alarm Signal Indicator AIS-P onto the STS-N if the STS-N is exceeding the BER threshold and the STS-N is carrying TDM traffic; and notifying another SONET VPR node if the STS-N is exceeding the BER threshold and the STS-N is carrying ATM traffic.

2. A Synchronous Optical Network SONET Unidirectional Path Switched Ring UPSR Virtual Path Ring VPR network, comprising:

a SONET UPSR carrying Asynchronous Transfer Mode ATM traffic by directing incoming ATM cells to destinations via a Virtual Path VP;

at least two SONET VPR nodes, each node including:
  at least one line card; and at least one SONET card protecting said virtual path by an Intra-Ring Communication IRC protocol, wherein said IRC protocol:

identifies a Bit Error Rate BER of an STS-N communication link;

collects statistical information on the BER of said communication link;

compares said statistical information to a predetermined threshold; and when a high BER occurs on said communication link, inserts an Path Alarm Signal Indicator AIS-P onto the STS-N if the STS-N exceeding the threshold is carrying TDM traffic; and notifies at least one other SONET VPR node if the STS-N exceeding the threshold is carrying ATM traffic; and at least one Synchronous Transport Signal-N STS-N communication link between said SONET VPR nodes.

3. A Synchronous Optical Network SONET Virtual Path Ring VPR node of a SONET Unidirectional Path Switched Ring UPSR for transmitting and receiving Asynchronous Transfer Mode ATM and Time Division Multiplexer TDM traffic comprising:

a first SONET card electrically connected to a clockwise CW communications ring for receiving and transmitting ATM and TDM traffic and communicating with at least one other SONET VPR node via an Intra-Ring Communication IRC protocol;

a second SONET card electrically connected to a counter-clockwise communications ring for receiving and transmitting ATM traffic and communicating with at least one other SONET VPR node via said IRC protocol; and an electrical connection between the said first and second SONET cards, wherein said SONET UPSR is comprised of Synchronous Transport Signal-Ns STS-Ns, and wherein said SONET VPR node's IRC protocol:

identifies a Bit Error Rate BER of an STS-N communication link;

collects statistical information on the BER of said communication link;

compares said statistical information to a predetermined threshold; and when a high BER occurs on said communication link, inserts an Path Alarm Signal Indicator AIS-P onto the Synchronous Transport Signal-N STS-N if the STS-N is exceeding the threshold and the STS-N is carrying TDM traffic; and notifies at least one other SONET VPR node if the STS-N is exceeding the threshold and the STS-N is carrying ATM traffic.

* * * * *